US005609972A

United States Patent [19]

Kaschmitter et al.

[11] Patent Number: 5,609,972
[45] Date of Patent: Mar. 11, 1997

[54] CELL CAP ASSEMBLY HAVING FRANGIBLE TAB DISCONNECT MECHANISM

[75] Inventors: James L. Kaschmitter, Pleasanton; Frank L. Martucci, Dublin; Steven T. Mayer, San Leandro; Jung H. Souh, Pleasanton; Sean Thompson, Dublin, all of Calif.

[73] Assignee: PolyStor Corporation, Dublin, Calif.

[21] Appl. No.: 610,388

[22] Filed: Mar. 4, 1996

[51] Int. Cl.⁶ .................................................. H01M 10/52
[52] U.S. Cl. .............................. 429/56; 429/61; 429/82
[58] Field of Search .................................. 429/7, 61, 56, 429/82, 161

[56] References Cited

U.S. PATENT DOCUMENTS

| | | |
|---|---|---|
| 3,218,197 | 11/1965 | Carmichael et al. . |
| 3,219,488 | 11/1965 | Southworth . |
| 3,617,386 | 11/1971 | Bosben et al. . |
| 3,783,024 | 1/1974 | Gibson et al. . |
| 4,022,366 | 3/1977 | Bones et al. . |
| 4,025,696 | 5/1977 | Tucholski . |
| 4,028,478 | 6/1977 | Tucholski . |
| 4,129,686 | 12/1978 | Kaduboski ................................ 429/61 |
| 4,307,158 | 12/1981 | Thibault ................................... 429/56 |
| 4,430,392 | 2/1984 | Kelley et al. ............................. 429/53 |
| 4,722,874 | 2/1988 | Marchak .................................. 429/56 |
| 4,818,641 | 4/1989 | Ledencian ................................ 429/61 |
| 4,879,187 | 11/1989 | Biegger ..................................... 429/7 |
| 4,943,497 | 7/1990 | Oishi et al. ............................... 429/53 |
| 4,971,867 | 11/1990 | Watanabe et al. ........................ 429/61 |
| 4,981,553 | 1/1991 | Huhndorff ................................ 429/61 |
| 4,992,344 | 2/1991 | Coppers ................................... 429/61 |
| 5,026,615 | 6/1991 | Tucholski ................................. 429/61 |
| 5,171,648 | 12/1992 | Beard ....................................... 429/61 |
| 5,204,194 | 4/1993 | Miller et al. ............................... 429/7 |
| 5,300,369 | 4/1994 | Dietrich et al. ....................... 429/61 X |
| 5,418,082 | 5/1995 | Taki et al. ................................. 429/53 |
| 5,427,875 | 6/1995 | Yamamoto et al. .................... 429/223 |
| 5,464,705 | 11/1995 | Wainwright .............................. 429/61 |
| 5,523,178 | 6/1996 | Murakami et al. ....................... 429/53 |

FOREIGN PATENT DOCUMENTS 1-294372  11/1989  Japan .

OTHER PUBLICATIONS

Sony Corporation 1G by 65 millimeter cell (labeled 18650), Apr. 1995.

*Primary Examiner*—Stephen Kalafut
*Attorney, Agent, or Firm*—Hickman Beyer & Weaver

[57] ABSTRACT

A cell pressure control system is disclosed which includes a conductive frangible tab which tears in response to a defined pressure. The frangible tab is affixed at one position to a stationary member and at another position to a deflection member which deflects in response to increasing internal cell pressure. When the cell pressure increases to a dangerous level, the deflection member exerts sufficient pressure on the frangible tab to cause it to break. When the tab breaks, the cell goes to open circuit, thus reducing the danger of continued pressure build up. If the cell's internal pressure continues to increase even after the pressure contact is opened, a second stage of the pressure control mechanism may be activated. Specifically, a pressure rupturable region in the above-mentioned deflection member will rupture and release the cell's internal pressure.

24 Claims, 12 Drawing Sheets

5,609,972

CELL CAP ASSEMBLY HAVING FRANGIBLE TAB DISCONNECT MECHANISM

BACKGROUND OF THE INVENTION

The present invention relates to cell containers for use in electrochemical energy storage devices. More particularly, the invention relates to cell caps having pressure release mechanisms that place the cell in open circuit by breaking an electrical contact when the cell internal pressure reaches a defined level.

Due to the increasing demand for portable electronic equipment, there is a corresponding demand for rechargeable cells having high specific energies. In order to meet this demand, various types of rechargeable cells have been developed including improved nickel-cadmium aqueous batteries, various formulations of aqueous nickel metal hydride batteries, and, most recently, nonaqueous rechargeable lithium metal and lithium intercalation cells.

Of particular interest in the context of the present invention are rechargeable lithium-ion cells, although other cell types may benefit as well. Because of the large amounts of energy stored in lithium ion cells and because of the potentially hazardous nature of some cell components, there is a risk of explosion or uncontrolled release of cell electrolyte.

Many lithium-ion cells operate at pressures in the range of 5-25 psi. Such pressures are normally produced by gases generated during the cell's formation cycle and operation. Higher pressures, however, can result from overcharge due to a faulty charger, external or internal cell shorting, exposure to excessive heat (e.g., fire), etc. Thus, lithium-ion cell housings should also include some mechanism for controlling the build-up of excess internal pressure. Simply installing a vent in the cell will serve this function by automatically discharging cell contents as internal pressures approach dangerous levels. However, such contents, including flammable organic electrolyte solvents, potentially hazardous electrolyte salts (e.g., lithium-hexafluorophosphate), and even burning lithiated carbon particles should not be released from the cell under pressure unless absolutely necessary to avoid explosion.

Thus, some cells have been designed with safety mechanisms to limit further increases in cell pressure before venting becomes necessary. One representative mechanism is an "18650 cell" (shown in FIGS. 1A and 1B) of manufactured by Sony Corporation of Japan. A similar mechanism is described in U.S. Pat. No. 4,943,497 issued to Oishi et al. As shown in FIGS. 1A and 1B, the top of a cell cap 114 includes a terminal contact 101 for connecting the cell to external circuitry. Of particular relevance here, terminal contact 101 includes vent holes 110, which allow the cell fluid to vent should the pressure in the cell interior become very high. The terminal contact 101 is supported against a positive temperature coefficient resistor ("PTC") 109 which is, in turn, supported against a nipple shaped conductive flexible member 104, with scoring 106. The whole assembly (terminal contact, PTC, and the conductive flexible member) is held together in electrical contact by a first plastic insert 103 and a metal outer jacket 108 as shown. A crimp in the outer jacket 108 gives it a "C" shape which holds the first plastic insert 103 in position against the terminal contact 101 and the conductive flexible member 104.

The nipple portion of conductive flexible member 104 is affixed to a metallic foil 111—which ranges in thickness from about 1-2 mils—by a weld 107. Foil 111 is, in turn, welded onto an aluminum disk 105, about 20 μm thick. As shown in FIG. 1B, the disk 105 includes a central opening, which is covered by foil 111, and three peripheral holes 113 which provide access to the cell interior. Further, peripheral holes 113 are aligned with passages 115 in a second plastic insert 116 so as to provide a fluid pathway from the cell interior to a pressure cavity 102. The second plastic insert 115 electrically insulates the aluminum disk 105 from the metal outer jacket 108, and it is held in place between the aluminum disk 105 and the first plastic insert 103 by the weld 107. Finally, a conductive tab 112 is welded to the bottom of the disk 105 to provide a conductive pathway from the cell cathode to the cell cap subassembly.

During normal operation, current flows from the cathode through tab 112, to disk 105 and foil 111, and then through weld 107 to the assembly of flexible member 104, PTC 109, and terminal contact 101, and finally out to an external circuit. The first plastic insert 103 and the second plastic insert 116 confine the current flow through this defined conductive pathway.

If the cell current reaches unusually high levels, the PTC 109 becomes resistive in response to the high applied current and thereby reduces the current flow. This is because the material used in the PTC typically is a mixture of polymer and carbon. When the current density through the PTC increases to a defined level, the polymer temperature passes a melting transition point and becomes resistive. If the current density drops back below the defined level, the polymer again becomes glassy and the PTC again becomes conductive. In general, this mechanism prevents cell internal heating and dangerous pressure build-up resulting from inadvertent shorting. However, if the problem is unrelated to excessive current flow or if the PTC fails or can not adequately control the current flow, other safety mechanisms are activated.

First, as pressure builds up within the cell, that pressure is transmitted to the pressure cavity 102 where it forces flexible member 104 upward. When the pressure build-up reaches a predefined level, the foil 111 tears at weld 107, thus breaking the conductive pathway to the terminal contact and putting the cell into open circuit. At that point, the cell is electrically isolated from external sources, and no further electrochemical reactions will occur within the cell that could cause the pressure build-up to continue. Although this renders the cell useless as an energy source, the severed electronic pathway hopefully prevents any dangerous consequences resulting from an uncontrolled discharge of cell fluids.

In the event of further excessive pressure build-up due to, for example, extreme temperatures outside the cell, the scoring 106 on the conductive flexible member will rupture to allow venting of cell contents (usually electrolyte) through vent holes 110, thereby preventing an explosion.

While the above design provides some measure of safety, it has certain drawbacks. First, it may be difficult to control the point at which the first safety mechanism places the cell into open circuit. Because the design relies on the breaking of the weld 107 (or tearing the foil 111 around the weld), the strength of the weld may have to meet exacting standards. This, of course, adds to the cell cost. In some cases, it may be possible that the vent design will not perform as intended because the weld 107 or foil 111 resists breaking until the cell pressure is high enough to rupture the scoring 106. Under such circumstances, cell fluids would be expelled before the first safety mechanism could place the cell into open circuit. If, on the other hand, the weld 107 is too weak, the connection 107 may break at slightly elevated, but not dangerous, pressures, resulting in a premature open circuit.

Second, the design may cause the leakage of electrolyte due to perforations in the foil 111. As the cell pressure reaches a predefined level, the foil 111 tears at weld 107. This tearing often creates perforations in foil 111 that may result in premature leakage of electrolyte. In addition, the design is rather complex and includes a large part count.

More recently, a safe cell cap relying on pressure contacts has been described in U.S. patent application Ser. No. 08/509,531 filed on Jul. 31, 1995, naming Mayer et al. as inventors, and entitled OVERCHARGE PROTECTION BATTERY VENT. That application is incorporated herein by reference for all purposes. The cell cap described therein employs a "flip burst disk" which is a dome shaped piece of aluminum metal. In normal cell operation, the dome protrudes from the cell cap, down toward the cell electrodes. In this configuration, the flip burst disk makes a pressure contact (to be contrasted with a welded contact) with a stationary aluminum member and thereby provides an electrical pathway from the cell terminal to the cathode. However, when the pressure within the cell increases to a first critical value, dome inverts (flips) so that it protrudes toward the top of the cell cap. In this configuration, the contact between the flip burst disk and the stationary member breaks and the cell is put into open circuit. If for some reason, the pressure continues to increase to a second critical level, the flip burst will rupture (burst) to release cell contents before an explosion occurs.

While the flip burst disk embodiment described above represents an improvement over conventional designs, it would still be desirable to have alternative designs that do not rely on pressure contacts.

SUMMARY OF THE INVENTION

The present invention provides improved cell pressure control systems having a conductive frangible member which breaks or tears in response to a defined pressure. The frangible member is affixed at one position to a stationary member and at another position to a deflection member which deflects in response to increasing internal cell pressure. When the cell pressure increases to a dangerous level, the deflection member exerts sufficient force on the frangible member to cause it to break. When the frangible member breaks, the cell goes to open circuit, thus reducing the danger of continued pressure build up. Unlike the above-described mechanisms, this invention does not rely on a breaking either a weld or a pressure contact.

If the cell's internal pressure continues to increase even after the pressure contact is opened, a second stage of the pressure control mechanism may be activated. Specifically, a pressure rupturable region in the above-mentioned deflection member will rupture and release the cell's excess internal pressure. Typically, the pressure rupturable region will be a perforated region or a region of reduced material thickness in the conductive deflection member. More preferably, the pressure rupturable region will be a scored region, and most preferably it will be a circularly scored region.

In a first aspect, the present invention provides a cell cap subassembly for controlling pressure build-up in a cell interior having an electrode. The cell cap subassembly can be characterized as including the following elements: (1) a terminal contact for making electrical contact with an external circuit; (2) a deflection member in electrical communication with said terminal contact and undergoing a displacement in response to an increase in pressure within the cell interior; (3) a frangible member connected to and in electrical contact with the deflection member. The frangible member has a frangible region located away from the deflection member. If the cell pressure builds to a first defined pressure, the frangible member breaks at the frangible region and thereby electrically disconnects the terminal contact from the electrode. At this point, current can no longer flow from the electrode to the terminal contact. To assist the breaking of the frangible member, the frangible region may include a scored region, a notch, or simply a thin region. As noted, the deflection member typically includes a pressure rupturable region which ruptures on a second defined pressure (which is greater than the first defined pressure).

In a preferred embodiment, the deflection member is a flip-burst disk having a substantially dome shaped flip portion and a rim portion connected to and located outside of the flip portion. The rim portion makes an electrical contact with the terminal contact, and the flip portion makes an electrical contact with one end of the frangible member. The cell cap subassembly may further include a conductive jacket, wherein the other end of the frangible member is welded to the jacket. The flip portion has a normal position and an inverted position, depending on the pressure within the cell. In its normal position, the flip portion protrudes away from the terminal contact and makes the electrical contact with the frangible member connected to the electrode. As the dome-shaped flip portion is designed to be an unstable compressively loaded structure, it inverts to protrude toward the terminal contact at the first defined pressure. In so doing, it pulls one end of the frangible member with it to break the tab at the frangible region. This of course breaks the electrical connection between the terminal contact and a cell electrode.

Preferably, the frangible member is a thin metal tab, but it may also be a thin wire or other structure which is conductive and frangible. In some embodiments, the frangible member acts as a fuse, such that it disconnects when a high current flows through it for a defined period of time.

In one embodiment, the cell cap subassembly includes an incisive element that rests against the frangible region of the frangible member. As the deflection member deflects under conditions of excessive cell pressure buildup, the incisive element remains fixed and assists in breaking the frangible member at the frangible region. Typically the incisive element is a rigid cylindrically shaped insulator. In order to facilitate the breaking of the frangible member at the frangible region, the incisive element may have a notch to hold the frangible region in place.

The cell cap subassembly may further include a positive temperature coefficient resistor (PTC) for electrically connecting the terminal contact to the deflection member. As noted, PTCs provide some measure of protection against excessively high cell currents by becoming very resistive at current densities greater than a predefined level.

Another aspect of the present invention provides a method for controlling pressure build-up in a cell. The method can be characterized as including the following steps: (1) providing a cell having a cell cap subassembly as described above; and (2) causing the deflection member to undergo displacement in response to a first defined pressure such that the frangible member breaks at the frangible region and thereby electrically disconnects the terminal contact from said electrode. If the pressure continues rising to a second defined pressure, the deflection member ruptures at a pressure rupturable region to provide a fluid pathway from the cell interior to the cell exterior.

A third aspect of the present invention provides a lithium ion cell which can be characterized as including the following elements: (1) a cell cap subassembly as described above; (2) an anode, including a specified anode material, which is capable of intercalating lithium during charge and deintercalating lithium during discharge; (3) a cathode, including a specified cathode material, which is capable of taking up lithium on discharge and releasing lithium on charge; and (4) an electrolyte conductive to lithium ions.

These and other features of the present invention will be presented in more detail in the following specification of the invention and in the associated figures.

DESCRIPTION OF THE PREFERRED EMBODIMENTS

The present invention provides apparatus and methods for releasing cell pressure build-up before it reaches dangerous levels. The invention accomplishes this by breaking a frangible tab, located inside a cell cap subassembly at moderately high pressures, thereby putting the cell into open circuit.

Figure 2:
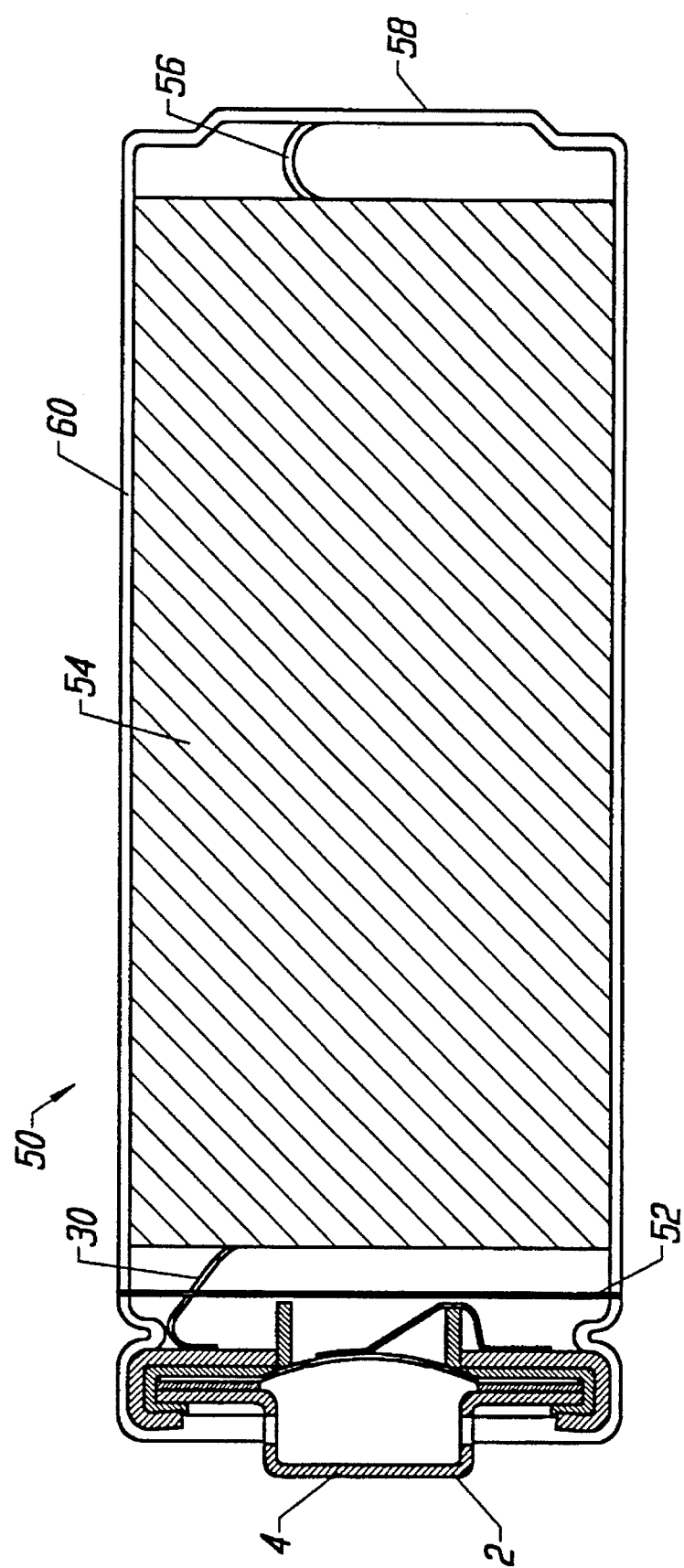
FIG. 2 is a cross-sectional diagram showing a side cross-sectional view of an entire cell having the cell cap subassembly shown in FIG. 3A.

FIG. 2 shows lithium ion cell 50 including a cell cap subassembly 2 in accordance with the present invention. Externally, the cell 50 includes a positive terminal 4, a negative terminal 58, and a cell can 60. The cell cap subassembly 2 is electrically connected by electrode tab 30 to a cathode part of an electrode "spiral" 54. A conventional spiral design employs a thin anode sheet and a thin cathode sheet wound together on one another in a spiral manner. Electrode spiral 54 is provided within cell can 60, and is separated from cell cap subassembly 2 by an insulator 52. In addition, the anode part of electrode spiral 54 is electrically connected to a negative terminal 58 by a negative terminal tab 56. Various embodiments of the cell cap subassembly 2 which can be mounted on top of cell 50 are set forth below.

1. Cell Cap Subassembly

Figure 3A:
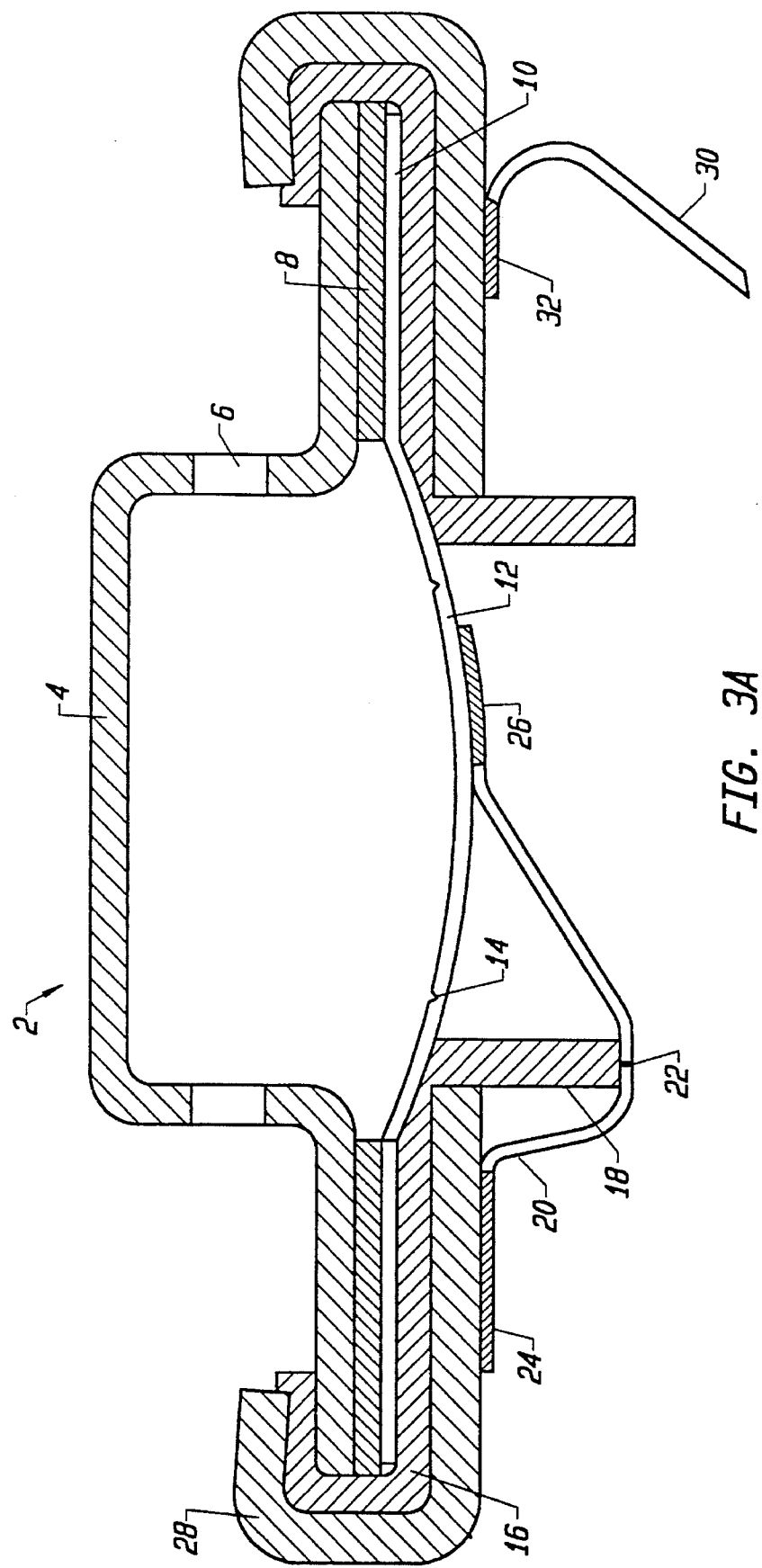
FIG. 3A is a cross-sectional diagram showing a side cross-sectional view of a cell cap subassembly having a scored frangible tab in accordance with one embodiment of the present invention.
Figure 3B:
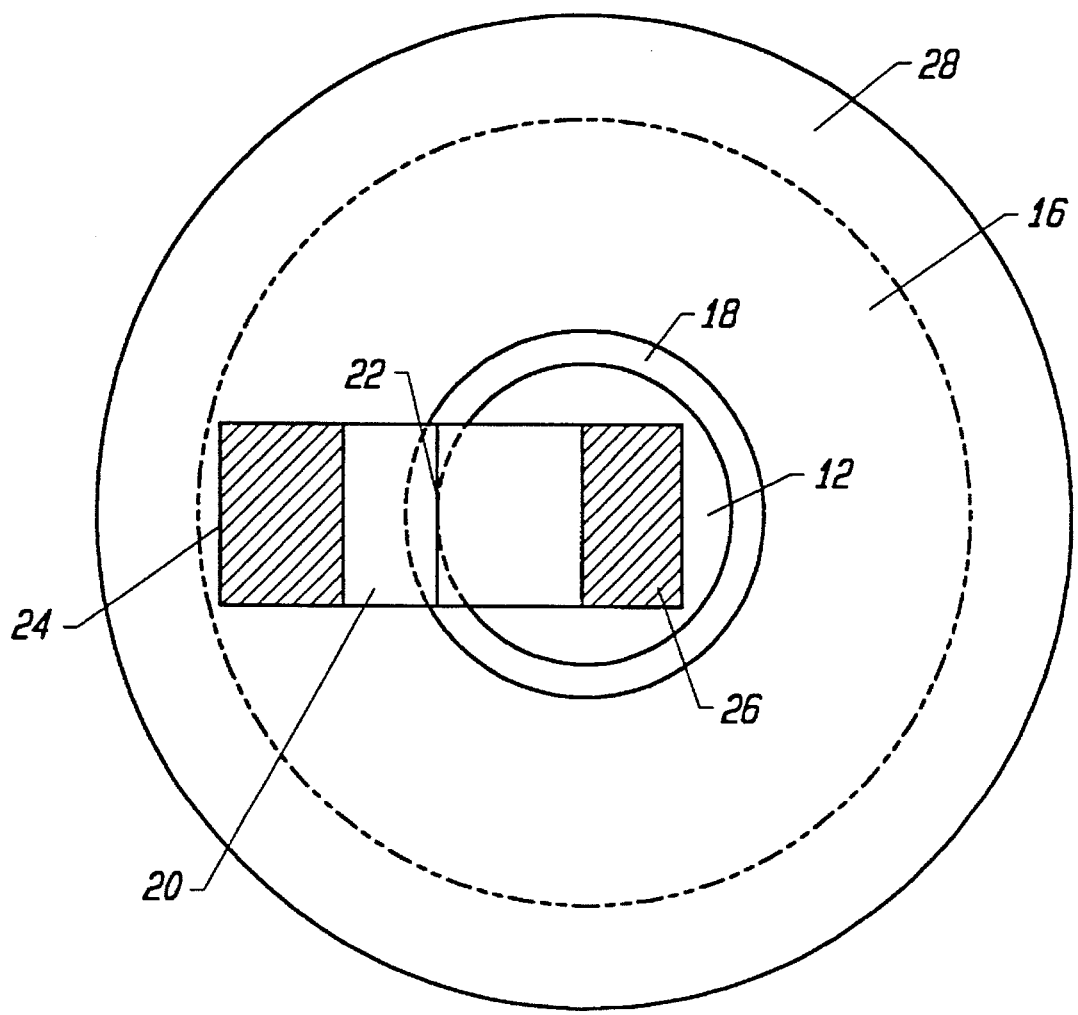
FIG. 3B is a cross-sectional diagram showing a bottom view of the cell cap subassembly shown in FIG. 3A.

Referring first to FIGS. 3A and 3B, a preferred cell cap subassembly 2 of the invention is shown in side cross-section and bottom views, respectively. For convenience, this design will be referred to herein as a "flip-burst disk" design. A terminal contact 4 having vent holes 6 is provided at the top of the flip-burst disk cell cap subassembly 2. If the internal cell pressure becomes very high, fluid from within the cell will vent through holes 6. The terminal contact 4 is supported against an optional PTC 8, which is, in turn, supported against a flip-burst disk 9. The flip-burst disk 9, also shown in FIG. 3C, has two main components: (1) a substantially dome shaped flip portion 12; and (2) a rim portion 10, against which the PTC 8 is supported. The flip portion 12 is affixed via a weld for example to a conductive frangible tab 20. Further, the flip portion 12 includes scoring 14, which will rupture at very high pressures to provide a fluid pathway allowing liquid cell contents to escape from the cell interior through vent holes 6.

Terminal contact 4, PTC 8, and the flip-burst disk 9 are held together in electrical contact by a gasket 16, which is further encased in a metallic subassembly jacket 28. As shown, the subassembly jacket 28 is crimped to define a "C" shape which holds the gasket 16 in engagement with terminal contact 4, PTC 8, and rim portion 10 of flip-burst disk 9. The gasket 16, also shown in FIG. 3D, has two main components: (1) a rim portion 19 and (2) an incisive member 18, which rests on a frangible tab 20 near or at a frangible region 22.

One end of the frangible tab 20 is connected to the subassembly jacket 28 at a first welded region 24, while the other end is connected to the tip of the flip portion 12 of the flip-burst disk 9 at a second welded region 26. Finally, an electrode tab 30 is connected to the subassembly jacket 28 at a welded region 32 and provides a conductive pathway from the cell cathode to the cell cap subassembly.

During normal operation, a conductive path is provided between the cell's negative terminal 58, the negative terminal tab 56, electrode spiral 54 (via ionic conduction), positive conductive tab 30, and the flip-burst disk cell cap subassembly 2 (including positive terminal 4). Within cell cap subassembly 2, the current enters the subassembly jacket 28, flows through the frangible tab 20, the flip-burst disk 9, the PTC 8, and out to external circuitry through the terminal contact 4.

As explained above, if the cell current reaches a defined high level, the PTC 8, becomes very resistive and thereby reduces the current through the cell. Further, in some embodiments, frangible tab 20 may itself act as a permanent fuse, disconnecting at a "fuse region" in response to high currents, independent of internal pressure. Conveniently, the frangible region may also serve as the fuse region of the tab. For example, the tabs shown in FIGS. 4B and 4C contain notches that can serve as fuse regions. Alternatively, the frangible tab may be replaced by a wire or other structure (described below) which is both frangible and fusible. Additionally, the invention covers systems including permanent fuses that are not necessarily frangible. To prevent strongly exothermic oxidation reactions, fuses should not contact oxygen. In a preferred embodiment, the cell interior is back-filled with argon and sealed to keep out oxygen. However, as an added precaution, it may be desirable to wrap, coat, or seal the fuse (frangible member) itself to protect it from any oxygen which may find its way into the cell interior.

If the frangible tab is designed to act as a permanent fuse, then the "resettable" PTC element may be unnecessary. In fact in some embodiments, a frangible tab fuse will be preferable to a PTC fuse. For example, it is known that PTC fuses exhibit extremely high resistance when exposed to short pulses of high current density, in the range of 5–8 amperes for a typical PTC fuse in an 18650 cell. In 18650 battery applications, such high current pulses are common and not particularly dangerous. A more conventional fuse (such as may be formed of a frangible tab) better accommodates high current pulses. In one example, an aluminum fuse region 14 square mils (about 8650 square microns) in cross-section maintains high conductivity until it disconnects at 10 amperes, a value suitable for use with 18650 cells. It should be remembered that the fuse region must be limited to a small portion of the tab or wire so that the overall cell resistance remains relatively low.

Often the action of the PTC or fusible tab will reduce the risk of dangerous pressure build-up. However, if the problem is unrelated to excessive current flow or if the these mechanisms fail or cannot adequately control the current flow, other protective mechanisms (described hereinafter) must be activated.

Figure 3C:
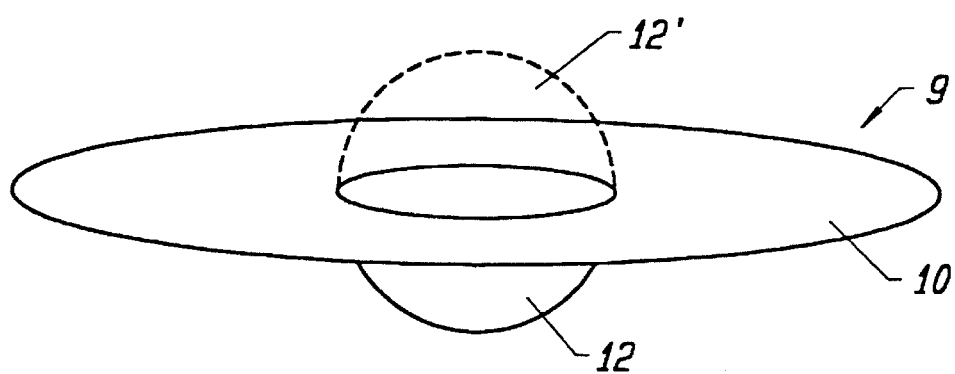
FIG. 3C is a diagram showing a perspective view of the flip-burst disk component shown in FIG. 3A.

FIGS. 3A and 3C show the orientation of the dome shaped flip portion 12 of the flip burst disk 9 during normal cell operation. FIG. 3C shows the flip portion 12 below the rim portion 10 and protruding downwards toward the cell interior (normal position). Similarly, FIG. 3A shows the flip portion 12 in normal position protruding away from the terminal contact 4, and establishing an electrical contact with the subassembly jacket 28 through a frangible tab 20.

When the pressure build-up in the cell equals a first defined pressure (which results in a critical buckling load on a compressively-loaded flip portion), the flip portion 12 inverts or collapses upward so that it protrudes towards the terminal contact 4 and assumes an inverted position 12' as shown in FIG. 3C. While flip portion 12 is inverting, the gasket 16 along with the incisive member 18 remains fixed. Simultaneously, the frangible tab 20 attached to the flip portion 12 on one end and attached to the subassembly jacket 28 on the other end, is suddenly pulled upward by the inversion of the flip portion 12. The incisive member 18, which was resting at the frangible region 22 of the frangible tab 20, helps cause an incision at the frangible region 22, and thereby opens the electrical contact with subassembly jacket 28. The incisive member 18 also prevents the remnants of the broken tab from recontacting one another. Once the tab breaks, the cell goes into open circuit, and electrochemical reactions within the cell cease. Inversion of the flip portion 12 along with the incision of the frangible tab 20 may therefore eliminate the cause of the pressure build-up and prevent an uncontrolled discharge of cell contents.

In some cases, however, the cell pressure may continue to build even after the cell goes into open circuit. This may be the case when, for example, the cell is placed in a fire. Under such circumstances, the cell provides for a controlled release of its contents (usually electrolyte and gas) to avoid explosion. This is accomplished when the pressure within the cell equals a second defined pressure, which is greater than the first defined pressure, and the flip portion 12 ruptures along scoring 14. This allows pressurized cell fluids to controllably vent through a vent hole 6.

The above-described flip-burst disk cell cap design provides certain advantages over the prior art. For example, the electrical contact through a frangible tab in the present invention may be more reliable in responding to excessive pressure buildup than the weld contact of the prior art. Thus, the pressure release mechanism of the present invention better ensures that the cell's safety features perform as intended. Further, the electrical disconnect mechanism does not rupture the flip burst disk and therefore create a potential pathway for cell contents to escape before higher pressures are reached.

Turning again to the construction of subassembly 2, the terminal contact 4 may be made from any conductive material that is stable at the cell potentials to which it is exposed. In a preferred embodiment, it is made from steel, and more preferably nickel plated steel. The PTC 8 acts as a resetable fuse, i.e., a material that temporarily increases the cell's resistance when the cell current exceeds a critical level. In a specific embodiment, the PTC 8 is made from a polymer and carbon mixture. One suitable material is provided under the brand name "POLYSWITCH" available from Raychem Corporation of Menlo Park, Calif.

The subassembly jacket 28 may be made from any conductive material which is stable at the operating potentials in the cell. Like the flip-burst disk, jacket 28 is preferably made from aluminum. In an alternative embodiment, jacket 28 may extend downward, toward the cell interior, at an angle such that its bottom edge rests against the frangible region of the tab. In this manner, the edge of the jacket acts as an incisive member and renders incisive member 18 unnecessary.

Most generally, the flip-burst disk 9 can be constructed from a conductive material which (1) resists corrosion at cell potentials to which it is exposed, and (2) has mechanical properties allowing the dome portion to invert at a first defined pressure. Preferably, the flip-burst disk is made from aluminum having a thickness (for at least the flip portion 29) of between about 50 to 250 μm, more preferably between about 100 and 200 μm, and most preferably about 125 μm. At such thickness, the flip-portion will invert somewhere in the range of 50–200 psi, i.e., the first defined pressure. In one preferred embodiment, the flip-portion has a radius of about 8 millimeters.

As noted, the flip portion 12 of the flip-burst disk 9 preferably has scoring 14, which provides a pressure rupturable region capable of rupturing under a second defined pressure. Scoring 14 may be formed by stamping flip portion 12 so as to provide a thin "scored" region of reduced thickness. The scoring can be of various shapes, such as circular, star-shaped, linear, etc. Preferably, the scoring provides a pressure rupturable region which ruptures at cell pressures of between about 350 and 400 psi, and more preferably between about 360 and 380 psi. Of course, the actual rupturing pressure will depend upon the cell design, but in all events it should be chosen to be below the pressure at which the cell would explode.

In alternative embodiments, the pressure rupturable region is not defined by scoring. For example, the pressure rupturable region may be a relatively wide region that is generally thinner or weaker than the surrounding regions of the flip-burst disk.

Figure 3D:
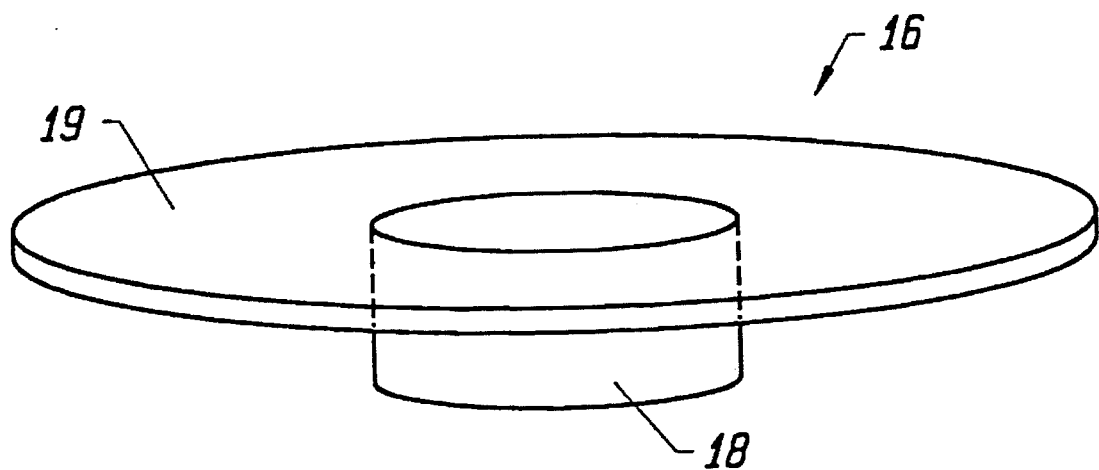
FIG. 3D is a diagram showing a perspective view of the gasket shown in FIG. 3A.

Gasket 16 may be made from any insulating material having sufficient structural integrity over a range of temperatures to hold together the terminal contact 4, PTC 8, and flip-burst disk 9 as shown in FIG. 3A. Preferred insulating materials include polypropylene, polybutyl terephthalate, polyvinylidene difluoride, and Teflon®. As shown in FIGS. 3A and 3D, the rim portion 19 and incisive member 18 of the gasket are one piece, but they can also be an assembly of two or more pieces. The rim portion 19 should be shaped adequately to hold together the assembly of terminal contact 4, PTC 8, and the flip-burst disk 9. Preferably, though not necessarily, the incisive member 18 assists in breaking the frangible tab 20 at the frangible region 22. This may be accomplished, for example, by providing the incisive member with sufficient sharpness to cause an incision at the frangible region or by providing the incisive member with a notch that corresponds to the location of the frangible region on the frangible tab. Once the frangible tab breaks, the incisive member should be positioned to keep the disconnected portions of the tab from accidentally touching one another and thereby reestablishing electrical conduction within the cell.

The frangible tab 20 may be made from any conductive material, but aluminum is preferred in lithium ion cells. While the dimensions of the frangible tab may vary widely to meet with requirements of this invention, it has been found that the tab thickness may be between about 0.0075 and 0.125 mm, while the tab width may be between about 2 and 5 mm (depending upon the disconnect pressure and other cell design parameters). In one specific embodiment, the tab width at the frangible region is about 0.5 mm (see the embodiment of FIG. 4B).

As noted, the frangible tab 20 typically has a frangible region 22 that is susceptible to incising or tearing under the tension created by the inversion of the flip portion 12. In order to ensure that during the inversion of the flip portion 12, the frangible region is incised as opposed to the welded regions 24 and 26 being breached, the welded region 24 and 26 must be stronger than the frangible region 22.

Figure 4A:
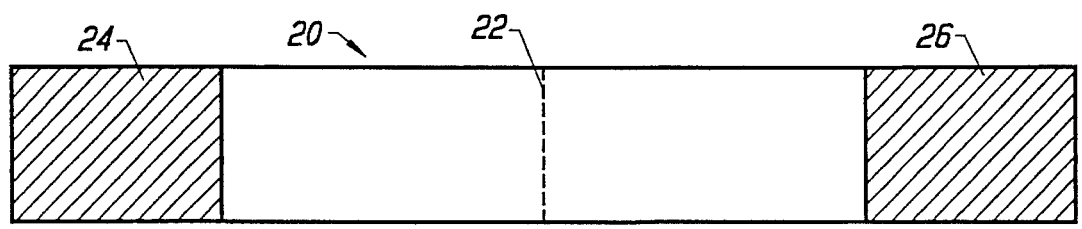
FIG. 4A is a diagram showing a frangible tab where the frangible region includes a scored region.
Figure 4B:
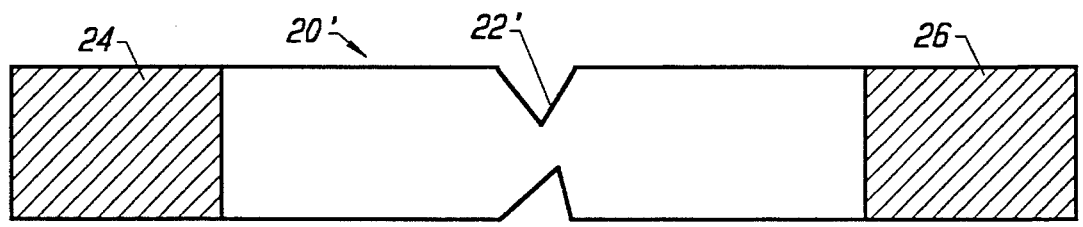
FIG. 4B is a diagram showing a frangible tab where the frangible region includes a double notched region.
Figure 4C:
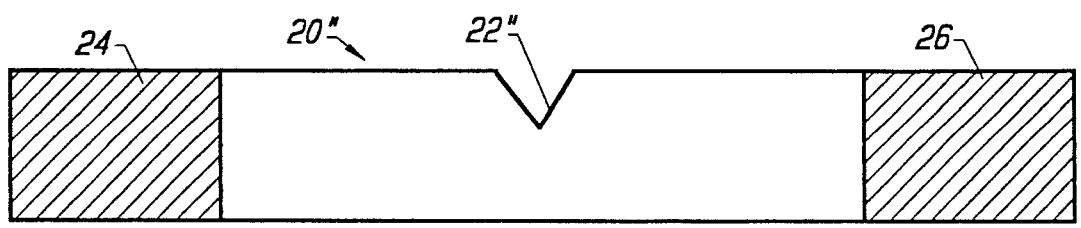
FIG. 4C is a diagram showing a frangible tab where the frangible region includes a single notched region.
Figure 4D:
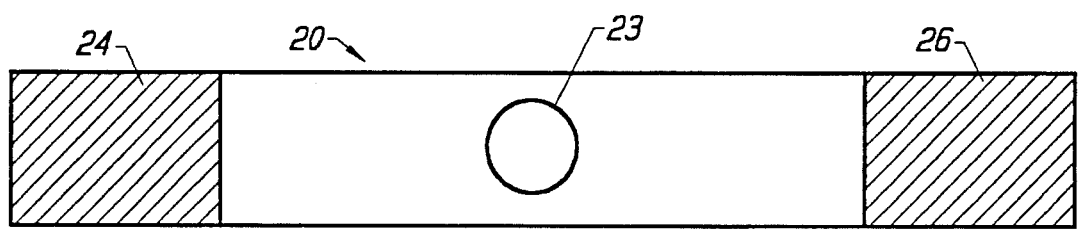
FIG. 4D is a diagram showing a frangible tab where the frangible region includes a hole.
Figure 4E:
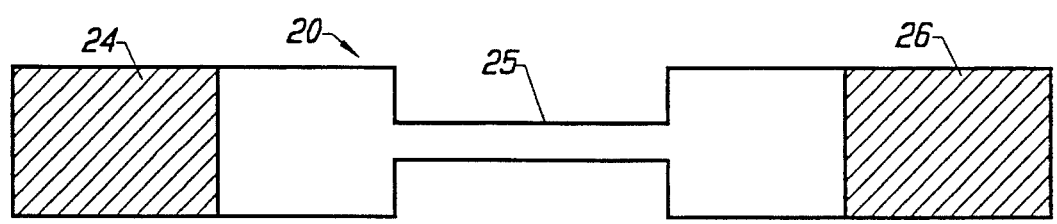
FIG. 4E is a diagram showing a frangible tab where the frangible region includes a narrow region.

FIGS. 4A, 4B, 4C, 4D, and 4E show examples of different frangible regions that facilitate the breaking of the frangible tab 20. FIG. 4A shows a frangible region 22 that includes a scored region 22 having a few small perforations lying in a line or curve. FIG. 4B and 4C show a double notched region 22' and a single notched region 22", respectively. The notches 22' and 22" may be created by cutting out pieces of frangible tab to form a region of tab having reduced width compared to the surrounding region. Such notches may, in some embodiments, be coupled with a scored region as shown in FIG. 4A. In alternative embodiments, the frangible tab may include a hole 23 (FIG. 4D), a region of reduced width 25 (FIG. 4E), a mesh region (not shown), or other structure serving as a frangible region. Also, the frangible tab may be replaced by a wire or other frangible structure that is conductive and breaks in response to the defined tensile stresses. In a particularly preferred embodiment, the frangible member is a 3 mil aluminum wire that disconnects at about 10 Amps.

Figure 5B:
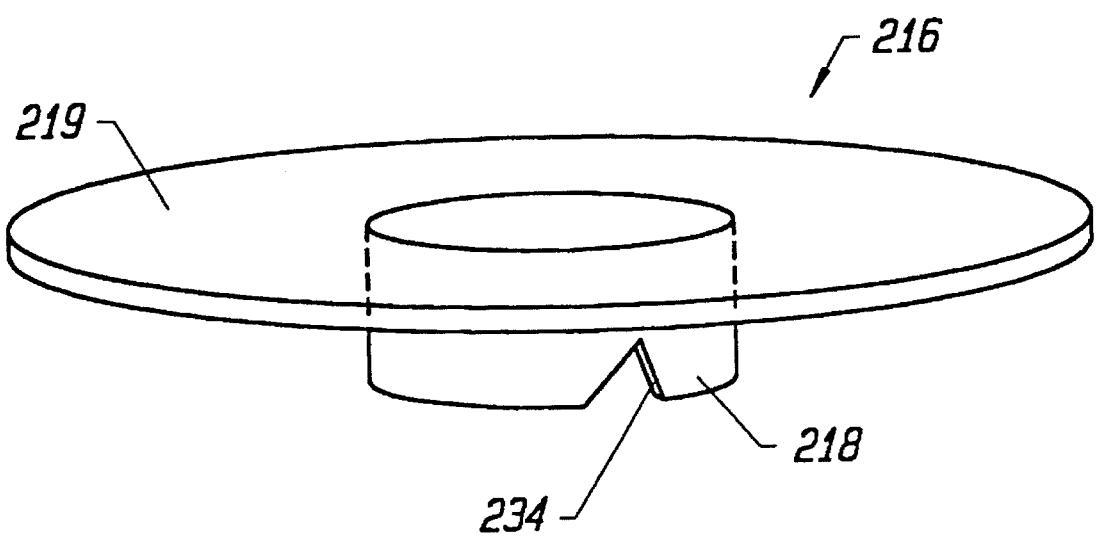
FIG. 5B is a diagram showing a perspective view of the gasket with a notched incisive member of FIG. 5A.
Figure 5A:
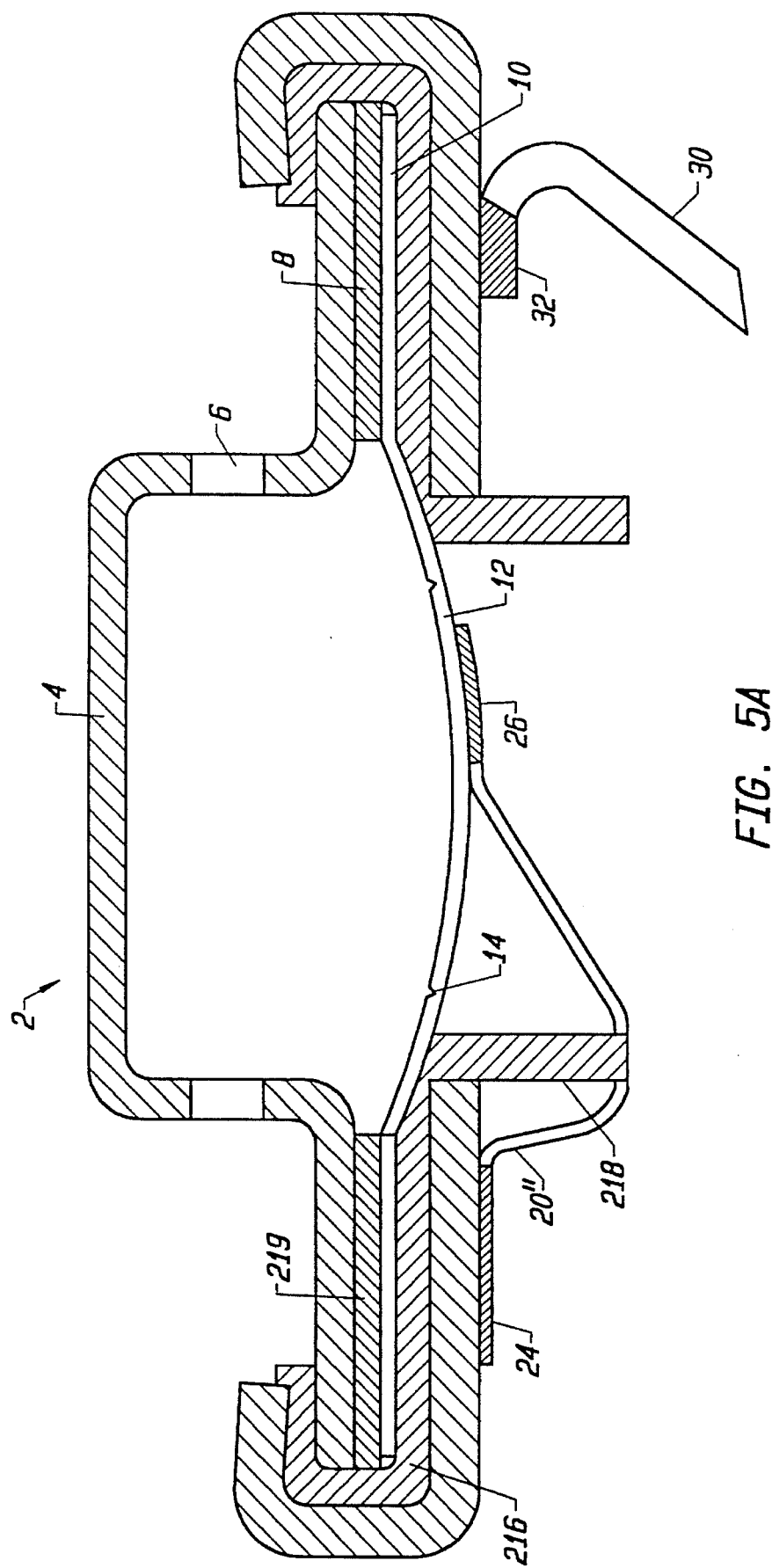
FIG. 5A is a cross-sectional diagram showing a side cross-sectional view of an alternative embodiment of the present invention which includes a notched incisive member.

An alternative embodiment of the present invention is illustrated in FIG. 5A. This embodiment is fairly similar to the above-described embodiment, with the exception of the gasket's incision member which has an alternative design for effectively incising the frangible region.

Figure 1A:
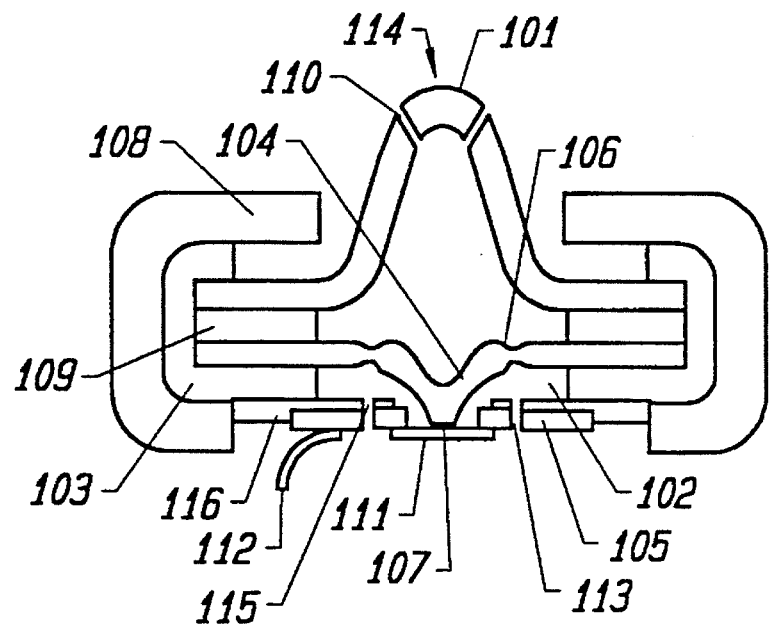
FIG. 1A is a cross-sectional diagram showing a side cross-sectional view of a cell cap subassembly of an available cell.
Figure 1B:
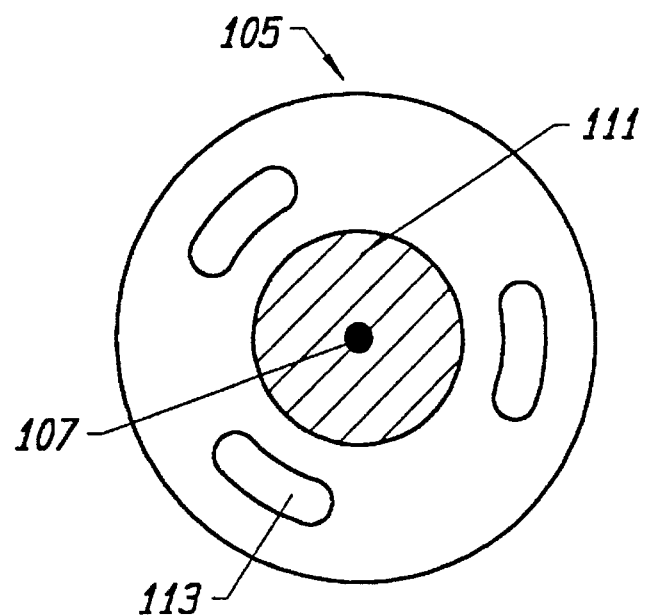
FIG. 1B is a cross-sectional diagram showing the top of a component of the subassembly shown in FIG. 1A.

Referring now to FIG. 5A, an incisive member 218 of a gasket 216, similar to gasket 16 shown in FIG. 1, rests on the frangible region (not shown) of the frangible tab 20", which connects to the subassembly jacket 28 at the welded region 24 on one end and connects to the flip portion 12 at the welded region 26 on the other end. FIG. 5B shows a perspective view of the gasket component 216 employed in the cell cap subassembly 2, shown in FIG. 5A. Gasket 216 has two main components: (1) a rim portion 219, and (2) an incisive member 218. Incisive member 218, in turn, includes a notched region 234 to the frangible tab in place. Preferably, notched region 234 is sharp to facilitate incising the frangible tab. In this regard, it is preferable to use the frangible tab 20' (FIG. 4B) or the frangible tab 20" (FIG. 4C) as these tabs include notches which will engage notch region 234 of the incisive member.

Figure 6:
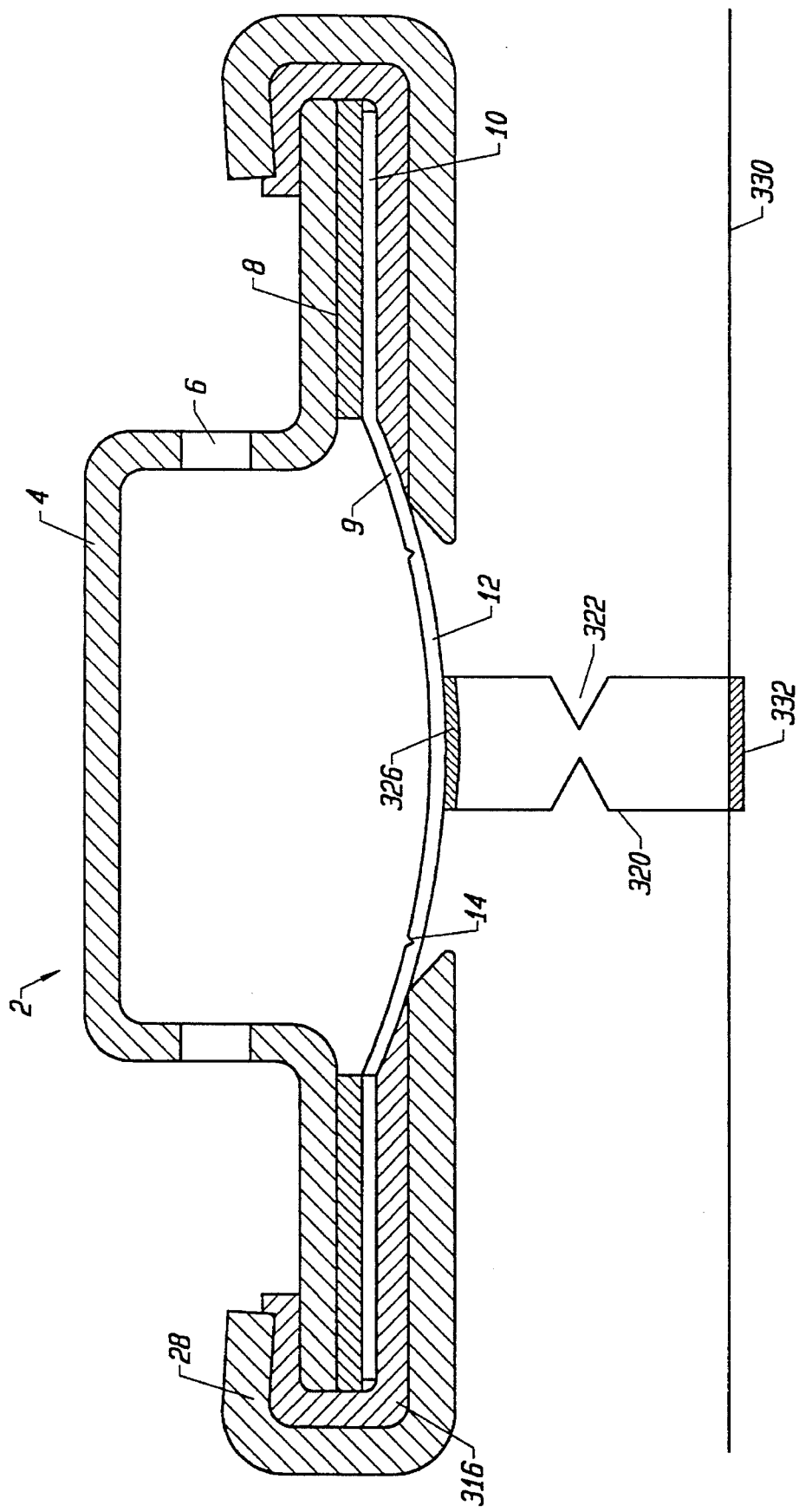
FIG. 6 is a cross-sectional diagram showing a front view of another alternative embodiment of the present invention which includes a vertical frangible tab.

Another embodiment of the present invention is shown in FIG. 6. In this embodiment, no incisive member is employed, rather a frangible tab 320 is vertically mounted between a tip of flip burst disk 9 and a flat immobile body 330. The body 330 may be separate conductive member in electrical communication with an electrode. Alternatively, body 330 may be an extension of jacket 28. If so, the frangible tab 320 may be attached thereto by a weld 332. Alternatively, the body 330 may be an insulator, in which case the tab 320 is electrically connected to the electrode by another contact. Preferably, the vertical frangible tab 320 is provided with a frangible region 322, which includes a double notch as shown in FIG. 4B. The remaining elements are as described above in connection with FIGS. 3A–3C. As before, the frangible tab 320 will break or tear at region 322 when the cell internal pressure reaches the first defined pressure, causing flip burst disk 9 to invert.

Figure 7A:
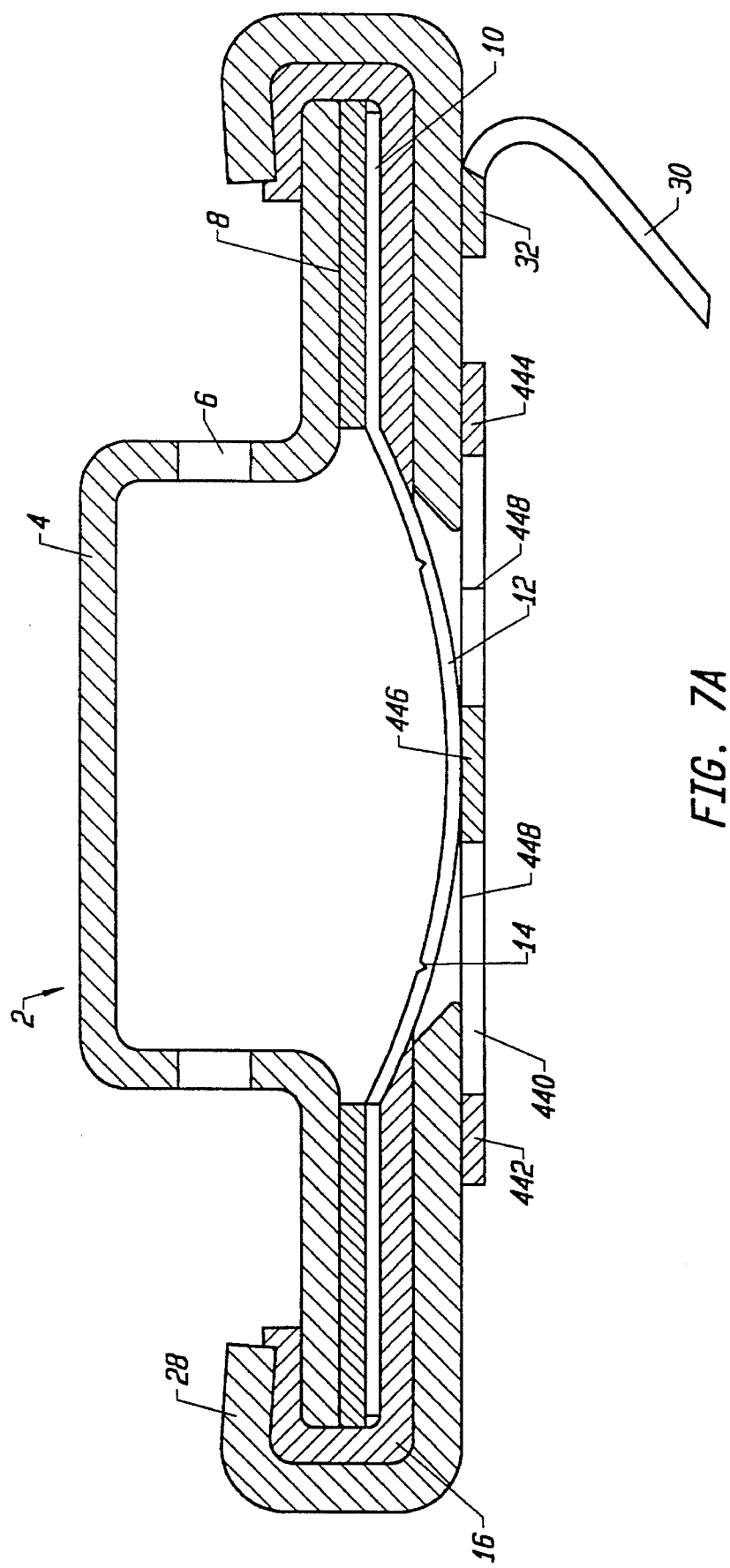
FIG. 7A is a cross-sectional diagram showing a side cross-sectional view of yet another alternative embodiment of the present invention which includes a flat aluminum disk.
Figure 7B:
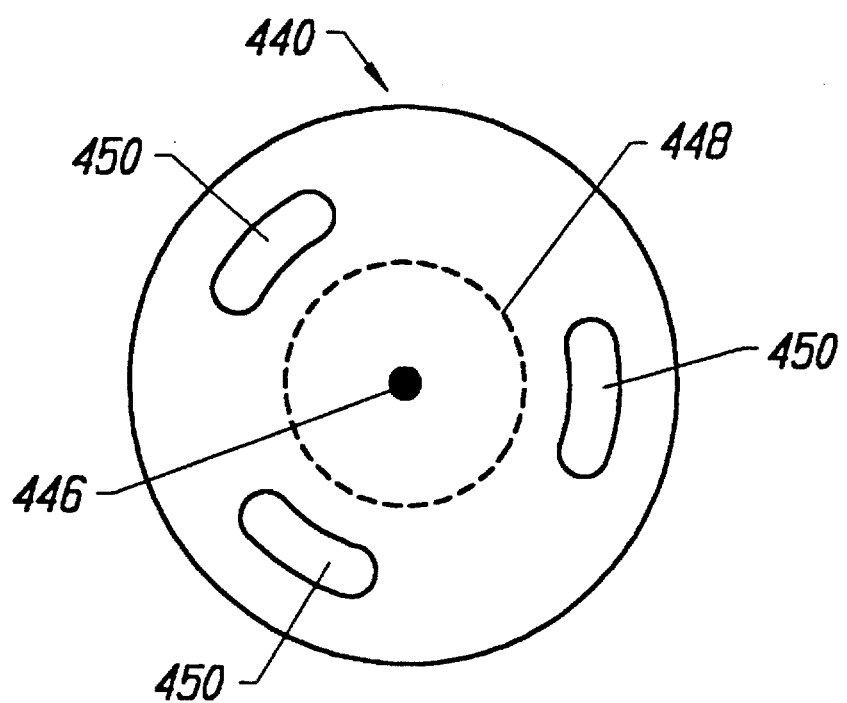
FIG. 7B is a diagram showing a top view of the flat aluminum disk as shown in FIG. 7A.

Yet another embodiment of the invention is shown in FIGS. 7A and 7B. In this embodiment, neither an incisive member nor a linear frangible tab (of the type shown in FIGS. 4A, 4B and 4C) is employed. The frangible tab of this embodiment includes a flat metallic disk 440 which is connected to the subassembly jacket 28 by welded regions 442 and 444 and also connected to the flip portion 12 of the flip burst disk 9 at welded region 446. The disk 440, which is preferably aluminum, has a frangible region 448 that includes serrations cause the disk 440 to tear apart when the flip burst disk 9 inverts.

When the excessive pressure build-up inside the cell equals a first defined pressure, that pressure is presented to the flip portion 12 through holes 450 in disk 440, and causes flip portion 12 to invert and pull upward a portion of disk 440 which is attached at the welded region 446. At that point, the surrounding portion of the disk remains fixed to the jacket 28 due to the welded regions 442 and 444. As a result, the disk 440 tears at frangible region 448. The cell cap subassembly 2 is thus put into open circuit, thereby stopping further electrochemical reactions within the cell.

Figure 8:
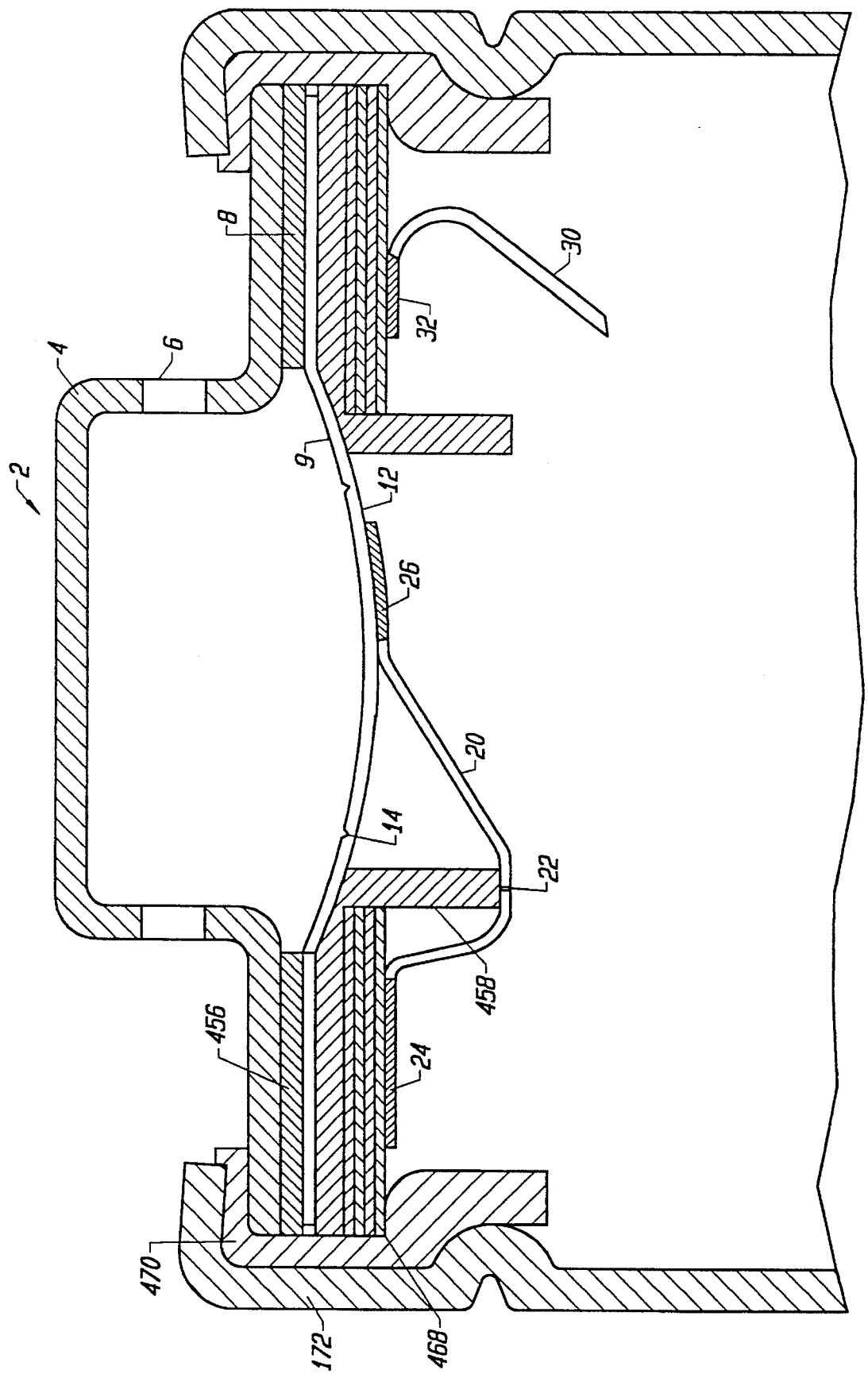
FIG. 8 is a cross-sectional diagram showing a side cross-sectional view of a cell cap subassembly having a scored frangible tab in accordance with a preferred embodiment of the present invention.

Another preferred embodiment of the present invention is illustrated in FIG. 8. This embodiment is somewhat similar to that shown in FIG. 3A, except that the cell can itself assumes the clamping function of the jacket 28 employed in the FIG. 3A design. The elements denoted by reference numbers common to FIGS. 3A and 8 are identical in both embodiments and therefore will not be discussed in detail here. A cell cap subassembly 2 includes an insulator gasket 456 having an incisive element 458 which functions in the same manner as element 18 of the FIG. 3A cell cap. A conductive washer 468 is provided beneath gasket 456 and serves as a stationary conductive welding surface for frangible tab 20 and electrode tab 30. A can gasket 470 abuts and insulates conductive washer 468, insulator gasket 456, flip burst disk 9, PTC element 8, and terminal contact 4. Finally, a metallic can 472 extends over and around the cell cap subassembly 2. As shown can 472 is crimped such that it clamps can gasket 470 around the various elements that it abuts. The can 472 otherwise acts as a cell container in the same manner as can 60 shown in FIG. 2.

2. Cells Utilizing Cell Contact Subassemblies

After the cell cap subassembly has been prepared, it is assembled in a lithium intercalation cell. Typically, the cell will include (1) a cell container (including the cell cap subassembly), (2) a composite cathode prepared as described above, (3) an intercalation anode capable of reversibly taking up lithium on charge and releasing lithium on discharge, (4) an electrolyte conductive to lithium ions, and (5) a separator between the anode and cathode.

Aside from the cell cap subassembly of this invention, conventional cell containers may be used to fabricate cells from the composite cathodes of this invention. Those of skill in the art will recognize the required properties of a cell container. It should be sized to compactly hold the various cell components and should be made of materials that are impervious to and chemically resistant to the other cell components at operating cell potentials.

The material used as the intercalation cell anode should exhibit high capacity, good reversibility, and a high average discharge voltage so as to achieve a high energy cell. In addition, the material should exhibit a relatively low formation capacity. Such materials include, by way of example, graphitic carbons, non-graphitic carbons, and mixtures of graphitic and non-graphitic carbons. Preferably cells of this invention employ such mixtures which are described in U.S. patent application Ser. No. 08/386,062, entitled "NON-AQUEOUS ELECTROLYTE SECONDARY BATTERY", filed on Feb. 7, 1995, and naming S. Mayer as inventor. That application is incorporated herein by reference for all purposes. Briefly, such composite anodes include mixtures of homogeneous graphitic carbon particles, homogeneous non-graphitic carbon particles, and binders as necessary. Such electrodes can be formulated to have high capacities, low electrode potentials, and, at the same time, sloping discharge profiles (i.e., the electrode potential varies with the degree of intercalation or state of charge). As explained in the 08/386,062 application, such discharge profiles allow lithium ion cells to perform well at high rates of discharge. Preferably, the open circuit potential of the anode varies by at least about 0.5 volts from a fully charged state in which the electrode is fully intercalated to a state of charge at about 90% of deintercalation. For comparison, a pure graphite intercalation electrode generally varies by only about 180 mV during discharge.

The material used as the intercalation cell cathode should exhibit high capacity, good reversibility of lithium insertion, and a high average discharge voltage so as to achieve a high cell energy. Such materials include, by way of example, lithium molybdenum sulfides, lithium molybdenum oxides, lithium vanadium oxides, lithium chromium oxides, lithium titanium oxides, lithium tungsten oxides, lithium cobalt oxides, lithium nickel oxides, and lithium manganese oxides (e.g., $LiMnO_2$ and $LiMn_2O_4$). In a particularly preferred embodiment of this invention, pure metal oxides (usually $LiCoO_2$, $LiNiO_2$, $LiMnO_2$ and/or $LiMn_2O_4$) are combined with one another in certain ratios, and with a conductive additive, a suspension thickener, and a solvent with a dissolved polymer, to produce a superior high voltage cathode with improved charge/discharge characteristics. The advantages and details of this approach are spelled out in U.S. patent application Ser. No. 08/493,715, entitled "NON-AQUEOUS ELECTROLYTE SECONDARY BATTERY", filed on Jun. 22, 1995, and naming S. Mayer as inventor. That application is incorporated herein by reference for all purposes.

An organic electrolyte for use in the cell may include any of various acceptable compounds and salts. Suitable organic electrolytes for use in intercalation cells include one or more of the following: propylene carbonate, ethylene carbonate, 1,2-dimethoxyethane, 1,2-diethoxyethane, γ-butyrolactone, tetrahydrofuran, 2-methyltetrahydrofuran, 1,3-dioxolan, 4-methyl 1,3-dioxolan, diethyl ether, sulfolane, acetonitrile, propionitrile, dimethyl carbonate, diethyl carbonate, anisole, methyl propionate, ethyl propionate, methyl acetate, normal-propyl acetate, iso-propyl acetate, normal-butyl acetate, ethyl methyl carbonate, and mixtures or combinations thereof. Suitable electrolyte salts include one or more of the following: lithium bistrifluoromethane sulfonimide ($Li(CF_3SO_2)_2N$ available from 3M Corp. of Minnesota), $LiAsF_6$, $LiPF_6$, $LiBF_4$, $LiB(C_6H_5)_4$, $LiCl$, $LiBr$, $CH_3SO_3Li$, and $CF_3SO_3Li$. In a preferred embodiment, the electrolyte includes a mixture of ethylene carbonate, dimethyl carbonate, and diethyl carbonate as the solvent. In a, particularly preferred embodiment, the electrolyte includes a mixture of (1) ethylene carbonate, dimethyl carbonate, and diethyl carbonate as solvent, and (2) dissolved $LiPF_6$ (which is present in a concentration of about 1 to 1.4M). Further description of preferred electrolyte systems may be found in U.S. patent application Ser. No. 08/598,046 entitled "NON-AQUEOUS ELECTROLYTE SECONDARY BATTERY", filed on Feb. 7, 1996, and naming S. Mayer et al. as inventors. That application is incorporated herein by reference for all purposes. The total concentration of $LiPF_6$ should not exceed the solubility limit of lithium in the solvent. Thus, the total concentrations of this salt as well as other will generally be maintained below about 1.5M.

Various separators known and widely-used in the art may be employed in the cells of this invention. Two particularly preferred separator materials are Celgard 2300 and Celgard 2400 available from Hoechst Celanese of Dallas, Tex. These materials are thin and inert and resist puncture. It should be noted that the Celgard 2300 becomes non-conductive at temperatures above about 120° C., thereby improving cell safety in response to possible cell internal short circuits which might be caused by puncture, crushing, etc.

3. Example

Figure 9:
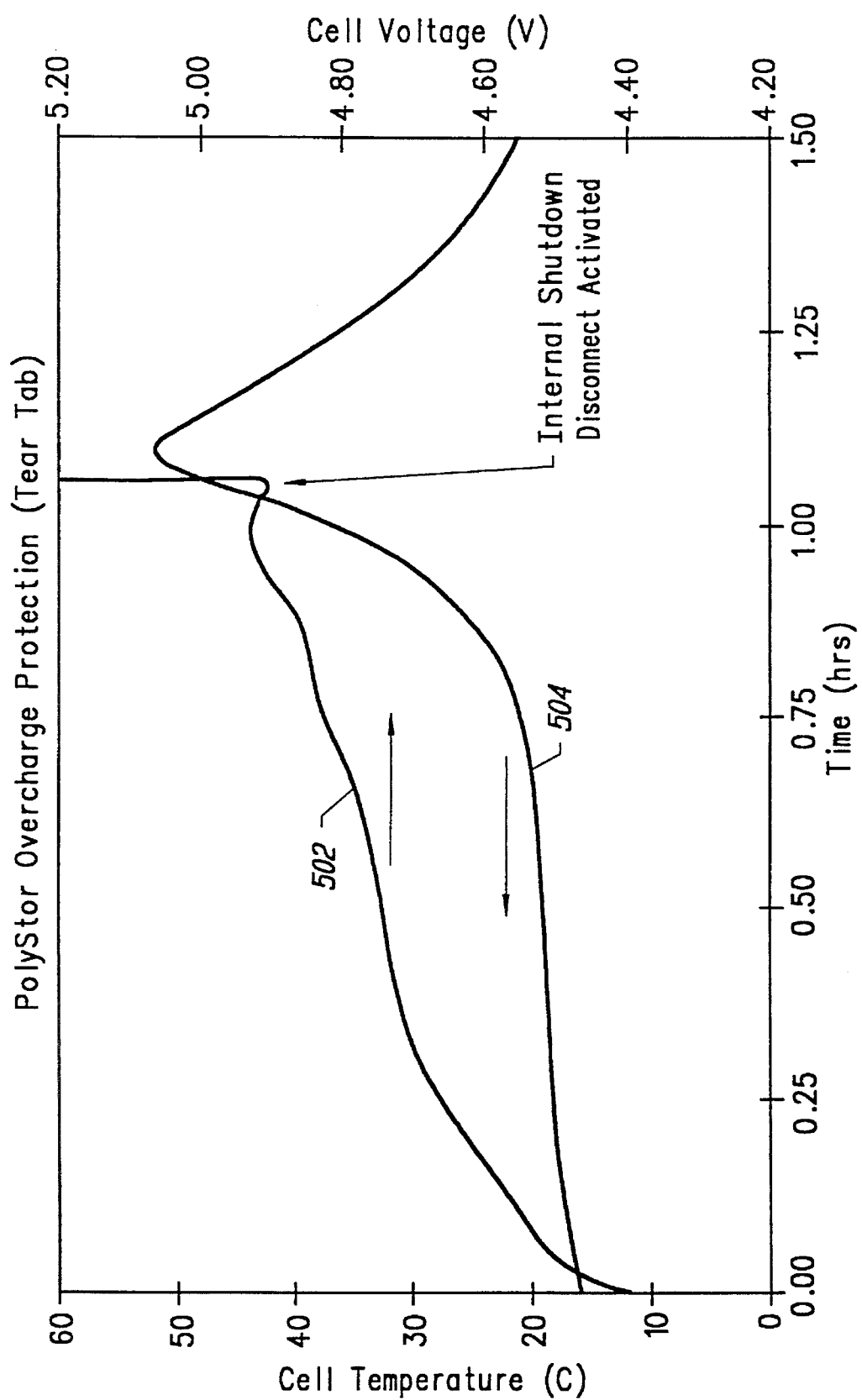
FIG. 9 is a plot of cell temperature versus charging time showing the protection the present invention provides against overcharge.

FIG. 9 is a graph showing how a frangible tab cell cap subassembly (of the embodiment shown in FIGS. 3A through 3B) in a 18 by 65 millimeter cylindrical cell responded to overcharging. The cell cap subassembly was constructed by bonding an uncrimped jacket to an uncrimped gasket.

A burst disk was prepared by pressing a flip portion into a disk of aluminum and scoring to provide a pressure rupturable region. Then a frangible tab was welded to the bottom of the flip portion of the burst disk. Thereafter, the flip burst disk with tab was placed in the uncrimped jacket/gasket assembly together with a PTC element and a cell terminal contact in the arrangement shown in FIG. 3A. Thereafter, the jacket/gasket was crimped to hold the assembly together. The frangible tab was then scored, combed over an incisive member of the gasket, and welded to the jacket.

Excess metal from the frangible tab was then removed and the cell cap subassembly was integrated in the remainder of an 18650 lithium ion cell.

In FIG. 9, curve 502 shows that cell potential gradually increased with time as the cell was overcharged (at 1.0 ampere and ambient temperature) beyond a normal full charged potential (about 4.2 volts). At about 1.1 hours of charging, at which point the cell potential reached 4.8 volts, the potential suddenly became infinite (over a period of less than 20 ms), indicating that the cell had gone into open circuit. This suggested that the frangible tab had in fact broken. Soon after the cell went into open circuit, the cell surface temperature began dropping as indicated by curve 504. Note that the cell surface temperature never exceeded about 55° C. (131° F.). Thus, a dangerous increase in cell temperature was averted by the cell disconnect mechanism. A post-mortem evaluation of the cell cap showed that the frangible tab had indeed broken as intended.

4. Conclusion

Although the foregoing invention has been described in some detail for purposes of clarity of understanding, it will be apparent that certain changes and modifications may be practiced within the scope of the appended claims. For instance, although the specification has primarily described cell cap subassemblies employing a flip disk as a deflection member, other deflection members such a bellows or bellville washer may be used. If a bellows is employed, increased deflection distance and improved tearing action may be realized in some cases. In addition, although the specification has described primarily lithium ion cells as the beneficiaries of the present invention, there is in principle no reason why the invention can not be employed in other cell types, including those employing either liquid or solid electrolytes. Further, while the specification has described a pressure release mechanism associated with a positive cell terminal (connected to a cathode on discharge), the same release mechanism could be employed at a negative cell terminal. Still further, while the specification has described a cylindrical cell design, there is in principle no reason why the invention can not be applied to prismatic or other cell designs. Therefore, the present embodiments are to be considered as illustrative and not restrictive, and the invention is not to be limited to the details given herein, but may be modified within the scope of the appended claims.

What is claimed is:

1. A cell cap subassembly for controlling pressure build-up in a cell interior having an electrode, said cell cap subassembly comprising:

a terminal contact for making electrical contact with an external circuit;

a deflection member being in electrical communication with said terminal contact, said deflection member undergoing a displacement in response to an increase in pressure within the cell interior;

a frangible member connected to and making electrical contact with said deflection member, said frangible member having a defined frangible region located away from said deflection member, wherein when said deflection member undergoes displacement in response to a first defined pressure, said frangible member breaks at said frangible region and thereby electrically disconnects said terminal contact from said electrode.

2. The cell cap subassembly as recited in claim 1, wherein said terminal contact includes vent holes for venting pressurized cell contents.

3. The cell cap subassembly as recited in claim 1, wherein said deflection member is a flip-burst disk having a substantially dome shaped flip portion and a rim portion connected to and located outside of said flip portion, said rim portion making electrical contact with said terminal contact, said flip portion normally protruding away from said terminal contact, but at the first defined pressure inverting such that it protrudes toward said terminal contact.

4. The cell cap subassembly as recited in claim 3, wherein the flip portion of said flip-burst disk comprises aluminum.

5. The cell cap subassembly as recited in claim 4, wherein the thickness of the flip-burst disk is between about 50 and 250 micrometers.

6. The cell cap subassembly recited in claim 3 wherein and said flip portion includes a pressure rupturable region which ruptures said flip portion at a second defined pressure which is greater than the first defined pressure.

7. The cell cap subassembly as recited in claim 6, wherein said pressure rupturable region is a scored region.

8. The cell cap subassembly as recited in claim 1, wherein said frangible region on said frangible member is a scored region.

9. The cell cap subassembly as recited in claim 1, wherein said frangible member is a tab and wherein said frangible region on said frangible member is a notched region.

10. The cell cap subassembly as recited in claim 1, wherein said frangible member is a wire.

11. The cell cap subassembly as recited in claim 1, wherein said frangible member comprises aluminum.

12. The cell cap subassembly as recited in claim 1, wherein said frangible member includes a fuse region which acts as a fuse at a defined current.

13. The cell cap subassembly as recited in claim 1, further comprising an incisive member that rests against said frangible region, wherein said incisive element remains in a fixed position when said deflection member undergoes displacement in response to an increase in pressure within the cell interior.

14. The cell cap subassembly as recited in claim 13, wherein said incisive element is cylindrical in shape.

15. A method for controlling pressure build-up in a cell having an electrode, the method comprising the following steps:

(a) providing a cell having a cell cap subassembly and a cell interior, the cell cap subassembly including (i) a terminal contact for making electrical contact with an external circuit, (ii) a deflection member that is in electrical communication with said terminal contact and undergoes a displacement in response to an increase in pressure within the cell interior, and (iii) a frangible member connected to and making electrical contact with said deflection member, said frangible member having a defined frangible region located away from said deflection member; and (b) causing the deflection member to undergo displacement in response to a first defined pressure such that said frangible member breaks at said frangible region and thereby electrically disconnects said terminal contact from said electrode.

16. The method of claim 15 wherein the deflection member is a flip-burst disk having a substantially dome shaped flip portion in electrical communication with a terminal contact, said flip portion being provided in a normal position in which it protrudes away from said terminal contact, said flip portion also having an inverted position in which it protrudes toward said terminal contact, and wherein the step of causing the deflection member to undergo displacement includes inverting said flip portion when exposed to the first defined pressure, whereby the frangible member breaks.

17. The method of claim 15 further comprising a step of rupturing a pressure rupturable region on said deflection member when exposed to a second defined pressure in the cell which is greater than said first defined pressure, whereby a fluid pathway is provided from the cell interior to the cell exterior when the pressure rupturable region ruptures.

18. The method of claim 15 wherein said first defined pressure is caused by a continuous electrochemical reaction within the cell.

19. A lithium ion cell comprising:
   (a) a cell container having a cell cap subassembly including
      (i) a terminal contact for making electrical contact with an external circuit,
      (ii) a conductive deflection member that is in electrical communication with said terminal contact and undergoes a displacement in response to an increase in pressure within the cell interior, and
      (iii) a frangible member connected to and making electrical contact with said deflection member, said frangible member having a defined frangible region located away from said deflection member, wherein when said deflection member undergoes displacement in response to a first defined pressure, said frangible member breaks at said frangible region and thereby electrically disconnects said terminal contact from said electrode;
   (b) an anode provided within the cell container and capable of intercalating lithium during charge and deintercalating lithium during discharge, the anode including an anode material;
   (c) a cathode provided within the cell container and capable of taking up lithium on discharge and releasing lithium on charge, the cathode including a specified cathode material; and
   (d) an electrolyte conductive to lithium ions and provided within said cell container.

20. The lithium ion cell of claim 19 wherein said conductive deflection member includes a pressure rupturable region, and wherein said pressure rupturable region of said conductive deflection member ruptures on a second defined pressure which is greater than said first defined pressure.

21. The lithium ion cell of claim 19 wherein the deflection member is a flip-burst disk having a substantially dome shaped flip portion in electrical communication with a terminal contact, said flip portion being provided in a normal position in which it protrudes away from said terminal contact, said flip portion also having an inverted position in which it protrudes toward said terminal contact, and wherein the said flip portion inverts to said inverted position when exposed to the first defined pressure and thereby breaks the frangible member.

22. A cell assembly for controlling excessive current in a cell having an electrode, said cell assembly comprising:
   a terminal contact for making electrical contact with an external circuit;
   a deflection member that undergoes a displacement in response to an increase in pressure within the cell interior, and
   a frangible permanent fuse in electrical communication with said terminal contact and in electrical communication with said electrode, wherein when the current in the cell exceeds a predefined level, the permanent fuse permanently electrically disconnects the terminal contact from the electrode, and wherein said frangible permanent fuse is connected to said deflection member such that said frangible permanent fuse breaks when the displacement member undergoes said displacement.

23. The cell assembly of claim 22 wherein the cell is a lithium ion cell.

24. The cell assembly of claim 22 wherein the frangible permanent fuse comprises aluminum.

* * * * *